United States Patent [19]

Yokoi et al.

[11] Patent Number: 4,749,118
[45] Date of Patent: Jun. 7, 1988

[54] METHOD FOR BONDING CERAMIC TO METAL

[75] Inventors: Kazuaki Yokoi; Toshihiro Yamada; Akiomi Kohno; Motohiro Satou, all of Ibaragi; Hiroyuki Kawamoto, Hitachi, all of Japan

[73] Assignee: Hitachi, Ltd., Tokyo, Japan

[21] Appl. No.: 9,953

[22] Filed: Feb. 2, 1987

[30] Foreign Application Priority Data

Feb. 3, 1986 [JP] Japan .................................. 61-20101

[51] Int. Cl.⁴ .............................................. B23K 20/24
[52] U.S. Cl. ............................... 228/208; 228/263.12
[58] Field of Search ............ 228/116, 208, 209, 263.12

[56] References Cited

U.S. PATENT DOCUMENTS

| | | | |
|---|---|---|---|
| 3,136,050 | 6/1964 | Trueb et al. | 228/208 X |
| 3,246,395 | 4/1966 | Galmiche | 228/263.12 |
| 3,921,885 | 11/1975 | Knox | 228/208 X |

FOREIGN PATENT DOCUMENTS

| | | | |
|---|---|---|---|
| 47904 | 4/1979 | Japan | 228/208 X |
| 47905 | 5/1979 | Japan | 228/208 X |

Primary Examiner—Kenneth J. Ramsey
Attorney, Agent, or Firm—Antonelli, Terry & Wands

[57] ABSTRACT

When a ceramic is bonded to a metal having a low thermal expansion, if a Cr layer of a Cr diffusion layer is formed on the surface of the metal and the ceramic is bonded to the metal through this Cr layer or Cr diffusion layer by an Al insert, a bonded structure having a good air-tightness and a high strength is obtained.

6 Claims, 2 Drawing Sheets

METHOD FOR BONDING CERAMIC TO METAL

BACKGROUND OF THE INVENTION

(1) Field of the Invention

The present invention relates to a method for bonding a ceramic to a metal. More particularly, the present invention relates to a method for bonding a ceramic to a metal, which is suitable for obtaining a bonded structure for which a high strength and a high air-tightness are required.

(2) Description of the Prior Art

The conventional method for bonding a ceramic such as alumina to a metal comprises disposing an O-ring formed of pure Al as the insert between alumina and the metal and heating the assembly at a temperature higher than the melting point of the insert under an elevated pressure, as disclosed in the specification of U.S. Pat. No. 4,037,027.

According to this conventional bonding method, a metal, the main desired property of which is a corrosion resistance, is bonded to alumina, and use of a metal having a small thermal expansion or attainment of a good air-tightness is not taken into consideration.

SUMMARY OF THE INVENTION

It is a primary object of the present invention to provide a method for bonding a ceramic to a metal for obtaining a bonded structure having a good air-tightness and a high strength.

This object can be attained by using a material having a low thermal expansion, such as Fe-42 weight % nickel alloy or Kovar alloy as the metal to be bonded to the ceramic, forming a Cr layer or Cr diffusion layer on the surface of the low thermal expansion material by a chromizing treatment and bonding the low thermal expansion material to the ceramic through this Cr layer by using an Al insert.

More specifically, in accordance with the present invention, there is provided a method for bonding a ceramic to a metal, which comprises inserting an Al insert or an Al alloy in the bonding surface between the ceramic and the metal and heating the assembly under an elevated pressure, wherein a Cr layer is formed on the surface of the metal and the ceramic is bonded to the metal through the Cr layer by the insert.

BRIEF DESCRIPTION OF THE DRAWINGS

FIGS. 1 and 2 are diagrams illustrating the bonding method of the present invention, in which FIG. 1 shows a longitudinal section of the bonded portion and FIG. 2 shows the relation between the tensile strength of the bonded structure of Fe-42 weight % Ni alloy or carbon steel and the thickness of the insert.

DESCRIPTION OF THE PREFERRED EMBODIMENTS

The embodiments of the present invention will now be described in detail with reference to the accompanying drawings.

EXAMPLE 1

This example illustrates bonding of Fe-42 weight % Ni alloy to alumina.

Figure 1:
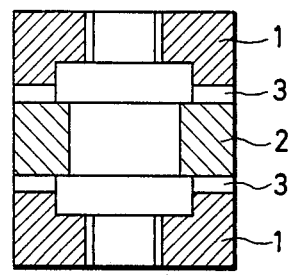

As shown in FIG. 1, an insert 3 having a three-layer structure comprising a core composed of an Al-Mn alloy and surface layers of an Al-Si-Mg alloy was inserted between a ring 1 formed of chromized Fe-42 weight % Ni alloy and an alumina ring 2, and the assembly was heated at a bonding temperature of 600° C. in a vacuum ($10^{-4}$ Torr) under a bonding pressure of 0.5 kgf/mm$^2$ for 30 minutes. Separately, a ring of untreated Fe-42 weight % Ni alloy was prepared and the bonding operation was carried out in the same manner as described above except that this ring of the untreated nickel alloy was used instead of the ring 1 of the chromized nickel alloy.

Incidentally, it is preferred that the bonding pressure be 0.15 to 1.0 kgf/mm$^2$. If the bonding pressure is lower than 0.15 kgf/mm$^2$, contamination of the surface of the insert is advanced to inhibit the bonding. If the bonding pressure is higher than 1.0 kgf/mm$^2$, the insert is deformed and the bonding strength is reduced.

The air-tightness of each of the bonded structure was examined with a He leak detector. In the case where the untreated Fe-42 weight % Ni alloy was bonded, a vacuum of $10^{-5}$ Torr was obtained but leak of He was caused. In this case, an intermetallic compound layer composed of Fe, Ni and Al was formed in the bonded interface, and fine cracks were formed in this intermetallic compound layer. The cracks were connected to one another in a hexagonal pattern in the intermetallic compound layer. These cracks acted as paths for the He gas to cause leak of He. In contrast, in the case where the chromized Fe-42 weight % Ni alloy was boned, leak of He was not obserbed and it was confirmed that the bonded structure had a high air-rightness. A very thin intermetallic compound layer having a thickness of several μm was formed in the bonded interface, but the intermetallic compound was composed of Al and Cr and Fe and Ni were not substantially found. Moreover, fine cracks acting as paths for the He gas were not formed in the intermetallic compound layer at all.

Figure 2:
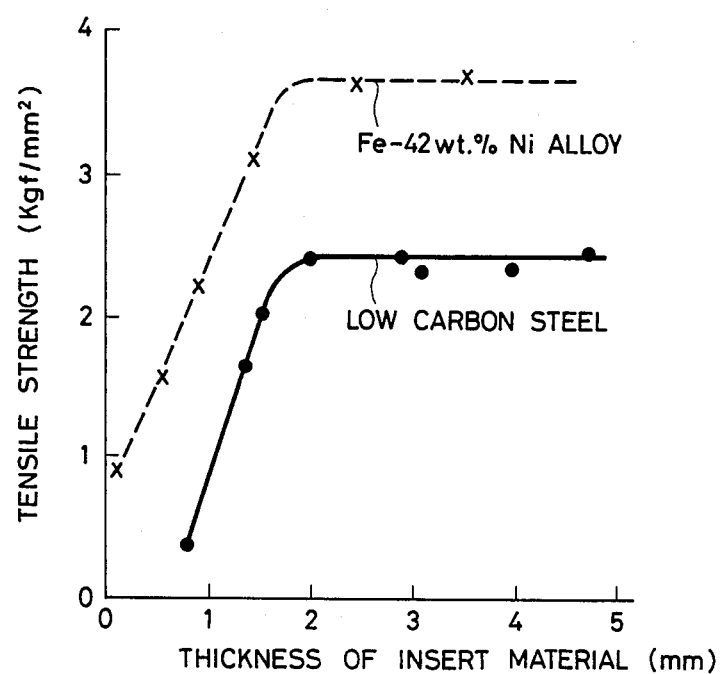

FIG. 2 illustrates the relation between the thickness of the insert 3 and the tensile strength, observed with respect to the bonded structure of chromized Fe-42 weight % Ni alloy and the bonded structure obtained by using low-carbon steel having a carbon content of 0.2% by weight (comparative example) instead of chromized Fe-42 weight % Ni. By using chromized Fe-42 weight % Ni alloy, which is a low thermal exapnsion material, the tensile strength was 1.5 times the tensile strength attained when low-carbon steel was used. Thus, it was confirmed that a bonded structure having a high strength and a high air-tightness can be obtained by using chromized Fe-42 weight % Ni alloy.

Incidentally, as is apparent from FIG. 2, a high tensile strength can be obtained if the thickness of the insert is at least 2 mm.

In the present example and subsequent examples, bonding was carried out in vacuum. However, according to the present invention, bonding can be carried out in an inert gas or in open air.

EXAMPLE 2

This example illustrates bonding of Kovar (Trade Mark of Westinghause Electric corp.) alloy to silicon carbide.

Silicon carbide was bonded to chromized Kovar alloy (Fe-29 weight % Ni-17 weight % Co) or untreated Kovar alloy under the same conditions as adopted in Example 1, and the He leak test was carried out. In case of the untreated Kovar alloy, fine cracks were formed in the intermetallic compound layer formed in the bonded interface and leak of He was observed. On the other hand, in case of the chromized Kovar alloy, leak of He was not caused in the bonded interface, and a bonded structure having a high air-tightness was obtained. In the bonded interface, there was formed an intermetallic compound layer which was slightly thicker than the intermetallic compound layer formed in case of the chromized Fe-42 weight % Ni alloy. However, also this intermetallic compound layer was composed of Al and Cr, and Fe, Ni and Co were not substantially observed. Fine cracks were not formed in this intermetallic compound layer at all.

When the tensile strength was determined in the same manner as described in Example 1, it was found that the tensile strength was 1.4 times the tensile strength attained in case of low-carbon steel.

From the foregoing results, it was found that also in case of Kovar alloy, a bonded structure having a high strength and a high air-tightness can be obtained by the chromizing treatment.

EXAMPLE 3

This example illustrates an application of the present invention to the fabrication of a sodium-sulfur cell.

Figure 3:
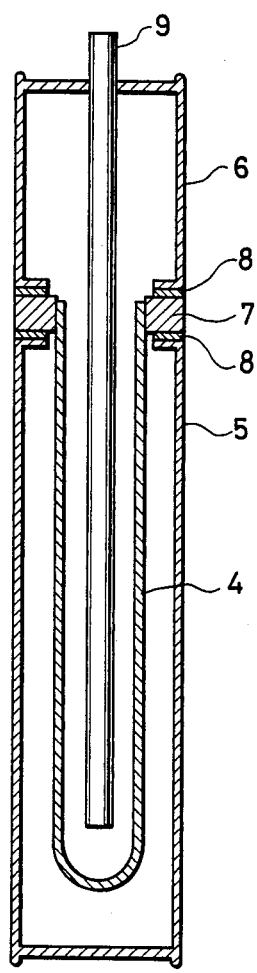
FIG. 3 is a sectional view of a sodium-sulfur cell as an application example of the present invention.

FIG. 3 is a sectional view of a sodium-sulfur cell as an application example of the present invention. Referring to FIG. 3, a solid electrolyte tube 4 is surrounded by a positive electrode container 5 and a negative electrode container 6 is provided thereon. An alumina ring 7 is soldered to the open end of the solid electrolyte tube 4 for electric insulation. The negative electrode container 6 and positive electrode container 5 are bonded to upper and lower faces, other than the above-mentioned soldered surface, of the alumina ring 7 so that the alumina ring 7 is interposed between the electrode container 5 and 6. A negative electrode tube 9 is disposed to inject sodium into the solid electrolyte tube 4 and negative electrode conatainer 6 safely.

In the present example, inserts 8 having a three-layer structure comprising a core of an Al-Mn alloy and surface layers of Al-10 weight % Si-2 weight % Mg alloy were inserted between the alumina ring 7 and the negative electrode container 6 and between the alumina ring 7 and the positive electrode container 5, and the assembly was heat-bonded at a bonding temperature of 600° C. in a vacuum of $10^{-4}$ Torr under a bonding pressure of 0.5 kgf/mm². The air-tightness of the obtained test piece was examined with a He leak detector. Leak of He was not observed at all.

A very thin layer of an intermetallic compound was formed in the bonded interface. The intermetallic compound layer comprised Al and Cr, and Fe and Ni were not substantially observed. Moreover, fine cracks acting as paths for the He gas were not observed at all.

EXAMPLE 4

This example illustrates another application of the present invention to the fabrication of a sodium-sulfur cell.

By using Fe-29 weight % Ni-17 weight % Co alloy and a zirconia ring as the constituent members, the bonding operation was carried out under the same conditions as adopted in Example 3.

A very thin layer of an intermetallic compound comprising Al and Cr was formed in the bonded interface, and Fe, Ni and Co were not substantially observed in the intermetallic compound layer. Accordingly, fine cracks were not formed in the intermetallic compound layer and leak of He was not observed at all. When the tensile strength of the bonded test piece was determined in the same manner as described in Example 3, it was found that the tensile strength was 1.7 times the tensile strength attained in case of 18-8 stainless steel. In the present example, the zirconia ring was used, but it was found that similar effects can be attained when a Sialon ring, a silicon nitride ring or a silicon carbide ring is used. Moreover, it was confirmed that similar effects can be obtained when Fe-Ni-Cr or Fe-Ni-Ti alloys are used for the negative electrode and positive electrode vessels.

In Examples 3 and 4, the bonding operation was carried out in a vacuum. However, the bonding operation can be carried out in an inert gas or open air.

What is claimed is:

1. A method for bonding a ceramic to a metal, which comprises inserting an Al insert or an Al alloy in the bonding surface between the ceramic and the metal and heating the assembly under an elevated pressure, wherein a Cr layer is formed on the surface of the metal and the ceramic is bonded to the metal through the Cr layer by the insert.

2. A method for bonding a ceramic to a metal according to claim 1, wherein the metal is an alloy composed mainly of Fe-Ni, Fe-Ni-Co, Fe-Ni-Cr or Fe-Ni-Ti.

3. A method for bonding a ceramic to a metal according to claim 1, wherein the surface of the metal is subjected to a chromizing treatment to form a Cr layer.

4. A method for bonding a ceramic to a metal according to claim 1, wherein a Cr layer is formed on the surface of the metal by a chromizing treatment, the thickness of the insert is at least 2 mm and the bonding pressure is 0.15 to 1.0 kgf/mm².

5. A method for bonding a ceramic to a metal, which comprises inserting an Al insert or an Al alloy in the bonding surface between the ceramic and the metal and heating the assembly under an elevated pressure, wherein a layer composed mainly of Cr is formed on the surface of the metal and the ceramics is bonded to the metal through the layer composed mainly of Cr by the insert.

6. A method for bonding a ceramic to a metal according to claim 5, wherein the metal is an alloy composed mainly of Fe-Ni, Fe-Ni-Co, Fe-Ni-Cr or Fe-Ni-Ti.

* * * * *